US012701006B2

(12) United States Patent
Lindholm et al.

(10) Patent No.: US 12,701,006 B2
(45) Date of Patent: Aug. 4, 2026

(54) COMPARTMENT LEVEL BINDING FOR WORKLOAD IDENTITY

(71) Applicant: Oracle International Corporation, Redwood Shores, CA (US)

(72) Inventors: Jacob M. Lindholm, Londonderry, NH (US); Joshua Aaron Horwitz, Centreville, VA (US); Abhinav Mishra, Livermore, CA (US); Karl Halley Heiss, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 300 days.

(21) Appl. No.: 18/422,812

(22) Filed: Jan. 25, 2024

(65) Prior Publication Data

US 2025/0030680 A1     Jan. 23, 2025

Related U.S. Application Data

(60) Provisional application No. 63/528,210, filed on Jul. 21, 2023.

(51) Int. Cl.
| | |
|---|---|
| *H04L 9/32* | (2006.01) |
| *G06F 16/27* | (2019.01) |
| *H04L 9/40* | (2022.01) |

(52) U.S. Cl.
CPC ............ H04L 9/3213 (2013.01); G06F 16/27 (2019.01); H04L 63/083 (2013.01)

(58) Field of Classification Search
CPC ...... H04L 9/3213; H04L 63/083; G06F 16/27
See application file for complete search history.

(56) References Cited

U.S. PATENT DOCUMENTS

| | | |
|---|---|---|
| 10,680,827 B2 | 6/2020 | Barbour et al. |
| 11,431,513 B1 | 8/2022 | Cannata et al. |
| | (Continued) | |

FOREIGN PATENT DOCUMENTS

EP        3416333 A1    12/2018

OTHER PUBLICATIONS

U.S. Appl. No. 18/422,916, "Notice of Allowance", Jul. 24, 2025, 14 pages.

(Continued)

*Primary Examiner* — Clayton R Williams
(74) *Attorney, Agent, or Firm* — Kilpatrick Townsend & Stockton LLP

(57)        ABSTRACT

Techniques are described for mapping a namespace to a compartment. An example method includes receiving, by a manager instance and from a pod, a first request for a token. The manager instance can transmit, to a token issuance service, a second request for the token. The token issuance service can identify a mapping object that maps the namespace to the resource. The token issuance service can transmit, to an identity service, the mapping object and a third request for the token. The identity service can identify a compartment of the customer tenancy based at least in part on the compartment identifier, the compartment managing the resource. The identity service can determine whether the pod has permission to access the resource. The identity service can generate the token based at least in part on the mapping object and the policy. The identity service can transmit the token to the pod.

20 Claims, 13 Drawing Sheets

800

Receive, by a manager instance of the computing system and from a pod, a first request for a token used to access to a resource managed by a customer tenancy, the pod managed by a provider tenancy and associated with a namespace — 802

Transmit, by the manager instance of the computing system and to a token issuance service of the computing system, a second request for the token — 804

Identify, by the token issuance service of the computing system, a mapping object mapping the namespace to the resource, the mapping object comprising a namespace identifier and a compartment identifier — 806

Transmit, by the token issuance service of the computing system and to an identity service of the computing system, the mapping object and a third request for the token — 808

Identify, by the identity service of the computing system, a compartment of the customer tenancy based at least in part on the compartment identifier, the compartment managing the resource — 810

Access, by the identity service of the computing system, a policy stored in a compartment — 812

Determine, by the identity service of the computing system, whether the pod, managed has permission to access the resource based at least in part on the policy — 814

Generate, by the identity service of the computing system, the token based at least in part on the mapping object and the policy — 816

Transmit, by the identity service of the computing system, the token to the pod — 818

(56)      References Cited

U.S. PATENT DOCUMENTS

| | | | |
|---|---|---|---|
| 2017/0339196 A1 | 11/2017 | Lewis et al. | |
| 2018/0083971 A1 | 3/2018 | Brown et al. | |
| 2018/0309759 A1 | 10/2018 | Leibmann et al. | |
| 2018/0367528 A1 | 12/2018 | Schwarz et al. | |
| 2020/0136825 A1* | 4/2020 | Gupta | G06F 9/5077 |
| 2020/0137078 A1* | 4/2020 | Tewari | H04L 63/101 |
| 2021/0157896 A1 | 5/2021 | Hashmi et al. | |
| 2021/0328793 A1 | 10/2021 | Saravanan et al. | |
| 2021/0377044 A1 | 12/2021 | Leibmann et al. | |
| 2022/0391523 A1* | 12/2022 | Kwong | G06F 21/604 |
| 2023/0155830 A1* | 5/2023 | Sethuraman | G06F 11/3006 |
| | | | 713/168 |
| 2023/0163967 A1 | 5/2023 | Cannata, Jr. et al. | |
| 2024/0007465 A1* | 1/2024 | Gupta | H04L 63/0807 |

OTHER PUBLICATIONS

"Granting Workloads Access to OCI Resources", Available Online at: https://docs.oracle.com/en-US/iaas/Content/ContEng/Tasks/contenggrantingworkloadaccesstoresources.htm, Jul. 12, 2023, 17 pages.
International Patent Application No. PCT/US2024/036357 , "International Search Report and Written Opinion", Sep. 25, 2024, 14 pages.
International Patent Application No. PCT/US2024/036357 , International Preliminary Report on Patentability, Mailed On Feb. 5, 2026, 11 pages.

* cited by examiner

Cluster 102

Namespace 104

First Service Account 106
(e.g., First Workload)

Pod C 116

Customer Code
With SDK 114

Pod A 110

Pod

Pod B 112

Pod

Second Service Account 108
(e.g., Second Workload)

Pod D 118

Customer Code
With SDK 114

Pod

Pod

Pod

Pod

800

| | |
|---|---|
| Receive, by a manager instance of the computing system and from a pod, a first request for a token used to access to a resource managed by a customer tenancy, the pod managed by a provider tenancy and associated with a namespace | 802 |
| Transmit, by the manager instance of the computing system and to a token issuance service of the computing system, a second request for the token | 804 |
| Identify, by the token issuance service of the computing system, a mapping object mapping the namespace to the resource, the mapping object comprising a namespace identifier and a compartment identifier | 806 |
| Transmit, by the token issuance service of the computing system and to an identity service of the computing system, the mapping object and a third request for the token | 808 |
| Identify, by the identity service of the computing system, a compartment of the customer tenancy based at least in part on the compartment identifier, the compartment managing the resource | 810 |
| Access, by the identity service of the computing system, a policy stored in a compartment | 812 |
| Determine, by the identity service of the computing system, whether the pod, managed has permission to access the resource based at least in part on the policy | 814 |
| Generate, by the identity service of the computing system, the token based at least in part on the mapping object and the policy | 816 |
| Transmit, by the identity service of the computing system, the token to the pod | 818 |

FIG. 8

COMPARTMENT LEVEL BINDING FOR WORKLOAD IDENTITY

CROSS-REFERENCES TO RELATED APPLICATIONS

This application claims the benefit of U.S. Provisional Application No. 63/528,210, filed on Jul. 21, 2023, which is incorporated by reference in its entirety.

BACKGROUND OF THE INVENTION

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

BRIEF SUMMARY

Embodiments described herein are directed toward a method for mapping a namespace to a compartment. The method can include receiving, by a manager instance of a computing system and from a pod, a first request for a token used to access to a resource managed by a customer tenancy.

The method can further include transmitting, by the manager instance of the computing system to a token issuance service of the computing system, a second request for the token.

The method can further include identifying, by the token issuance service of the computing system, a mapping object that maps the namespace to the resource, the mapping object can include a namespace identifier and a compartment identifier.

The method can further include transmitting, by the token issuance service of the computing system and to an identity service of the computing system, the mapping object and a third request for the token.

The method can further include identifying, by the identity service of the computing system, a compartment of the customer tenancy based at least in part on the compartment identifier, the compartment managing the resource.

The method can further include accessing, by the identity service of the computing system, a policy stored in a compartment.

The method can further include determining, by the identity service of the computing system, whether the pod has permission to access the resource based at least in part on the policy.

The method can further include transmitting, by the identity service of the computing system, the token to the pod.

Embodiments can further include a computing system, including one or more processors and a computer-readable medium including instructions that, when executed by the processor, can cause the one or more processors to perform operations including receiving, by a manager instance of the computing system and from a pod, a first request for a token used to access to a resource managed by a customer tenancy.

The instructions that, when executed by the one or more processors, can further cause the one or more processors to perform operations including transmitting, by the manager instance of the computing system to a token issuance service of the computing system, a second request for the token.

The instructions that, when executed by the one or more processors, can further cause the one or more processors to perform operations including identifying, by the token issuance service of the computing system, a mapping object that maps the namespace to the resource, the mapping object can include a namespace identifier and a compartment identifier.

The instructions that, when executed by the one or more processors, can further cause the one or more processors to perform operations including transmitting, by the token issuance service of the computing system and to an identity service of the computing system, the mapping object and a third request for the token.

The instructions that, when executed by the one or more processors, can further cause the one or more processors to perform operations including identifying, by the identity service of the computing system, a compartment of the customer tenancy based at least in part on the compartment identifier, the compartment managing the resource.

The instructions that, when executed by the one or more processors, can further cause the one or more processors to perform operations including accessing, by the identity service of the computing system, a policy stored in a compartment.

The instructions that, when executed by the one or more processors, can further cause the one or more processors to perform operations including determining, by the identity service of the computing system, whether the pod has permission to access the resource based at least in part on the policy.

The instructions that, when executed by the one or more processors, can further cause the one or more processors to perform operations including transmitting, by the identity service of the computing system, the token to the pod.

Embodiments can further include a non-transitory computer-readable medium having stored thereon instructions that, when executed by one or more processors, causes the one or more processors to perform operations including receiving, by a manager instance of the computing system and from a pod, a first request for a token used to access to a resource managed by a customer tenancy.

The instructions that, when executed by the one or more processors, can further cause the one or more processors to perform operations including transmitting, by the manager instance of the computing system to a token issuance service of the computing system, a second request for the token.

The instructions that, when executed by the one or more processors, can further cause the one or more processors to perform operations including identifying, by the token issuance service of the computing system, a mapping object that maps the namespace to the resource, the mapping object can include a namespace identifier and a compartment identifier.

The instructions that, when executed by the one or more processors, can further cause the one or more processors to perform operations including transmitting, by the token issuance service of the computing system and to an identity service of the computing system, the mapping object and a third request for the token.

The instructions that, when executed by the one or more processors, can further cause the one or more processors to perform operations including identifying, by the identity service of the computing system, a compartment of the customer tenancy based at least in part on the compartment identifier, the compartment managing the resource.

The instructions that, when executed by the one or more processors, can further cause the one or more processors to perform operations including accessing, by the identity service of the computing system, a policy stored in a compartment.

The instructions that, when executed by the one or more processors, can further cause the one or more processors to perform operations including determining, by the identity service of the computing system, whether the pod has permission to access the resource based at least in part on the policy.

The instructions that, when executed by the one or more processors, can further cause the one or more processors to perform operations including transmitting, by the identity service of the computing system, the token to the pod.

BRIEF DESCRIPTION OF THE DRAWINGS

FIG. 8 is an example process flow for using a mapping object to access a resource, according to one or more embodiments.

DETAILED DESCRIPTION

Figure 1:
FIG. 1 is an illustration of an example CSP managed cluster, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) can manage multiple pods on behalf of a customer as part of the CSP's provider tenancy, where each pod includes one or more containers and their shared storage. A customer application can use code contained in different pods to collectively perform a task (e.g., authenticate a user password). In some instances, the code can require the use of one or more cloud resources to execute the task (e.g., access an object store). The one or more cloud resources may be managed in a customary tenancy. In other words, a pod managed in a provider tenancy may need to access a resource managed in a customer tenancy. The customer can write a policy against the token for a pod managed in a provider tenancy to either grant or deny permission to access the one or more resources managed in a customary tenancy. For example, the customer can write a policy that pod A can always access customer resource A. Therefore, if pod A makes a call for customer resource A, pod A can access customer resource A based on the policy.

One issue that can occur is if a customer wants to map a customer namespace managed by the CSP to a resource that is a part of the customer's tenancy. For example, the customer may wish to organize resources and policies, or the customer may wish to host a cluster for other customers. In this instance, both the CSP and the customer may have an interest in ensuring that the CSP managed namespace is mapped correctly to the customer managed resource. The customer may have an interest in ensuring that the correct CSP managed namespace is mapped to the correct CSP resource. The CSP may have an interest in ensuring that the customer has authorized the CSP to map the CSP managed namespace to the customer managed resource.

Embodiments described herein address the above-referenced issues by providing techniques permitting a customer to write a policy that empowers a CSP to map a namespace to a customer's compartment. A customer can create a mapping between the namespace and the compartment in a customer tenancy, and transmit the request to the CSP to store and use the mapping. The control plane of a CSP gateway service can authenticate the identity of the customer and determine whether the customer is authorized to request storing the mapping. In the event that the customer's request is authenticated and authorized by the control plane of the gateway service, a control plane of a container service and store the mapping between the CSP managed namespace and the customer managed resource.

At some point, a pod associated with the namespace may need to access the resource. The pod, however, may need to provide a credential to a CSP service managing the resource. In this event, the pod can request a token from the token issuance service. The token issuance service can receive the request, and in response, access the token issuance service's database to determine whether there is a mapping from the namespace and the compartment that is used to manage the resource. If a mapping exists, the token issuance service can notify an identity service. Based on the mapping and a customer policy, the identity service can issue and transmit the token to the token issuance service. The token issuance service can transmit the token to the pod. The pod can transmit the token along with a request to access the resource to the compartment, and in particular, a service managing the compartment. The herein described techniques permit a customer to map tenancy/compartment of a workload to a different tenancy/compartment. The herein described embodiments permit the CSP to ensure that the mappings are authorized by the customer.

FIG. 1 is an illustration 100 of an example CSP managed cluster, according to one or more embodiments. A cluster 102 can include containerized applications and services that are managed by one or more worker machines of the CSP. A CSP can use the cluster 102 to provide its customers availability and scalability of their applications and services, and the management of the customer's workloads. A worker node can host one or more pods that are each components of an application workload. The namespace 104 can include an identifier that provides a means to segregate resources. This cluster can be implemented by cloud service infrastructure as described below.

The namespace 104 can be associated with a first service account 106 and a second service account 108. As indicated above, the namespace 104 can further be mapped to a resource managed in a customary tenancy. The mapping can direct the CSP from the pod to the correct resource managed in the customer tenancy. Each service account can allow a customer to write policies (e.g., policy to enable the service account to scale up the number of pods in cluster) and otherwise manage permissions to use internal resources. Each of the first service account 106 and the second service account 108 can span multiple pods. Each pod can include one or more containers and can be associated with a software developer kit (SDK). The SDK can include, for example, a compiler, library, analytics tools, and other tools and resources that a customer can use to write code and make application programming interface (API) calls to access a CSP's resources.

The customer can further write a policy that enables a pod to access one or more resources of the CSP. As indicated above, in a conventional system, the customer may inadvertently neglect to write a policy for allowing a pod to access a CSP resource. For example, a customer may write a policy that permits pod A 110 to access CSP resource X. Furthermore, the customer may have inadvertently neglected to write a policy that permits pod B 112 to access CSP resource X. Therefore, if pod A 110 makes an API call to access resource X, the policy will permit pod A to access resource X. If, however, pod B 112 makes an API call to access CSP resource X, the lack of policy can prevent pod B 112 from accessing the resource. This can hold, even though both pod A and pod B are associated with the first service account 106.

Figure 2:
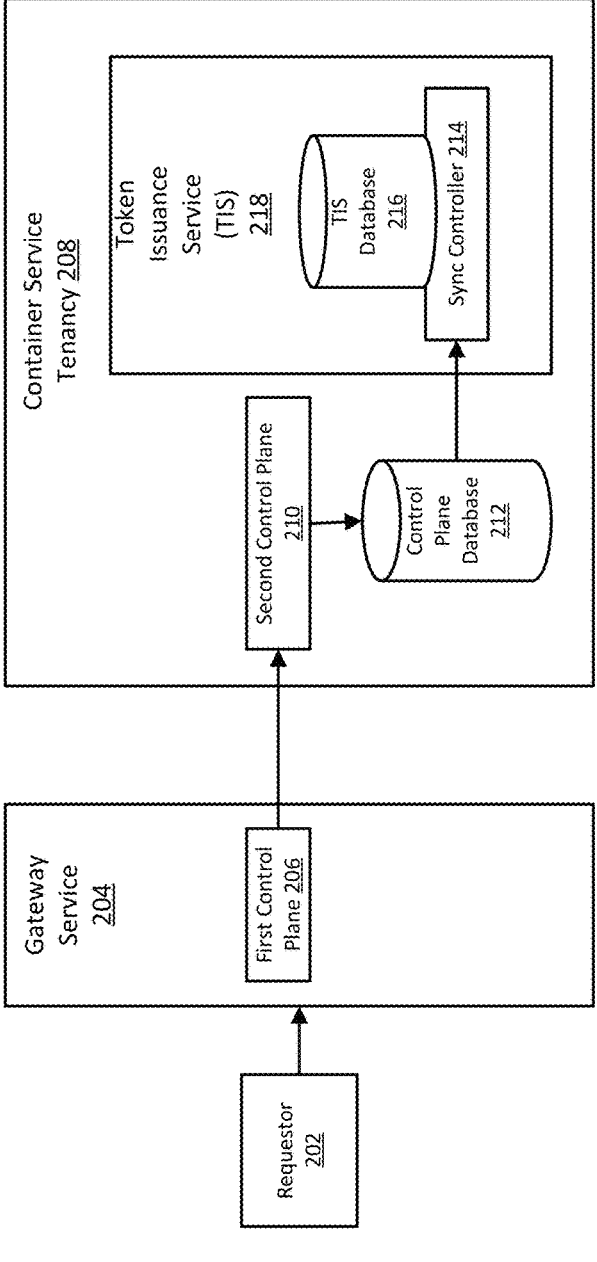
FIG. 2 is an illustration of an example system for creating a mapping, according to one or more embodiments.

FIG. 2 is an illustration 200 of an example system for creating a mapping, according to one or more embodiments. A requestor 202 can create a mapping from a namespace associated with the customer and managed by a provider tenancy to a resource manager by a customer tenancy. The mapping can bind the namespace (e.g., namespace 104) to the customer resource. The requestor 202 can transmit the mapping to a gateway service 204. As indicated above, one issue is that the namespace is managed by the CSP and the resource is managed by the customer. Therefore, a first control plane 206 of the gateway service 204 can determine whether the requestor 202 has permission to modify the cluster (e.g., cluster 102) by creating the mapping. The first control plane 206 can further determine whether the requestor 202 has permission to map the namespace to the customer's resource. The first control plane 206 can access an administrative entity of the cluster associated with the namespace and determine whether the administrative entity has granted permission to the requestor 202 to modify the cluster. The first control plane 206 can further access a primary entity of the customer tenancy to determine whether the requestor 202 has permission to map a namespace managed by the CSP to a resource managed by the customer tenancy. In most instances, it may be likely that the requestor 202 is the customer, and therefore the requestor 202 will have permission to modify the cluster and to map the namespace to the customer resource.

Assuming the first control plane 206 authenticates the requestor 202 and determines the requestor 202 is authorized to make the request, the first control plane 206 can transmit the mapping to a container service tenancy 208. In particular, the first control plane 206 can transmit the mapping to a second control plane 210 of the container service tenancy 208. The second control plane 210 can create a mapping object based on the customer created mapping. The second control plane 210 can further store a first instance of the mapping object in a control plane database 212. The first instance of the mapping object can include an identity of a CSP tenancy, cluster, and namespace to indicate which identities are to be used for the mapping object. The first instance of the mapping object can also include an identity of the customer tenancy and the compartment that the namespace is to be mapped. In some instances, the resource is managed by a compartment in the customer tenancy. For example, in some instances, when a CSP creates a tenancy for a customer, the customer tenancy can be a root compartment. The customer can then create additional compartments that correspond to common elements, for example, a common policy or a common access control. Each compartment can include related customer resources. In some instances, each mapping can further include a mapping identifier. Each mapping identifier and associated mapping information can be stored with a resource query service (RQS), In this sense, a customer can access the RQS and determine each mapping to the customer's resources, even if the mapping was not initiated by the customer.

The customer can request the mapping from the namespace in the CSP tenancy to the compartment that manages a particular resource in the customer tenancy. Therefore, if a pod associated with the namespace needs to access a resource in the compartment, the mapping can indicate that a policy was written to permit the pod to do so. It should be appreciated that once the mapping object is created, its existence may not be tied to the policy or the resource. In other words, if a customer changes a policy to no longer permit a pod associated with the namespace to access a customer's cloud resource, the mapping can still exist until the customer requests the mapping to be terminated. Similarly, if a resource for which a mapping is created is deleted, the mapping may still exist until the customer requests the mapping to be terminated. In the event that a pod requests access to a resources, that, either a current policy prohibits, or no longer exists, an identity service may need to issue a token to grant access to the resource. In the event that the identity service receives a request from a pod to access a resource, the identity service can verify that the customer's current policy permits access and that the resource exists prior to issuing the token.

In response to receiving the mapping object, the control plane database 212 can transmit the mapping object to a synchronization controller 214. In some instances, the control plane database 212 can stream mapping object information to the synchronization controller as it is created. The synchronization controller 214 can replicate the mapping object from the control plane database 212 onto a token issuance service database 216 of a token issuance service 218. In other words, the synchronization controller 214 can store a second instance of the mapping object in the token issuance service database 216. In some instances, the token issuance service database 216 is a Berkeley database (DB) that includes a key-value pair libraries. Storing the mapping in the token issuance service database 216 can permit the token issuance service from avoiding having to make an API call to the control plane database 212 for the mapping. Furthermore, if there is a loss of connectivity between the token issuance service and the control plane, the token issuance service 218 can continue to operate using a last known state of control plane database 212 prior to the loss of connectivity.

The synchronization controller 214 can perform various synchronization techniques. One technique can include the synchronization controller 214 can include a write-through cache in the local storage of host implementing the synchronization controller 214. The synchronization controller 214 can further employ a cursor that persists and is used to traverse the data transmitted from the control plane database 212 to the synchronization controller 214. The cursor can monitor for mapping object information transmitted by the control plane database 212.

From time to time, a host may go offline or otherwise lose connectivity with the control plane database 212. In the event that the host restarts, the host can initialize the token issuance service database 216. The synchronization controller 214 can further access the cursor to determine if any new mapping objects were transmitted during the time that the host was offline. The synchronization controller 214 can then replicate any mapping objects transmitted during the time the host was offline onto the token issuance service database 216.

Another technique can include polling the control plane database 212 and the use of a cell identifier. This technique is described in more detail with respect to FIG. 5. Yet another technique can be to limit the number of mappings that can be created. For this technique, the number of mappings per cluster can be limited. A current limit can be stored in a limit service of the CSP and updated as needed. By limiting the number of mappings per cluster to a set number of mapping objects, the CSP can limit the strain on instances of the synchronization controller 214 to perform the synchronization.

From time to time, a pod managed by the CSP tenancy may request to access a customer resource managed by the customer tenancy. In this instance, the token issuance service 218 may receive a request for a token that permits the pod to access the customer resource. In response to receiving the request, the token issuance service can access the token issuance service database 216 to determine if a mapping object from the namespace to the compartment managing the resource has been stored. If a mapping object is stored in the token issuance service database 216, the token issuance service 218 can transmit the mapping object to an identity service along with a request for the token.

Figure 3:
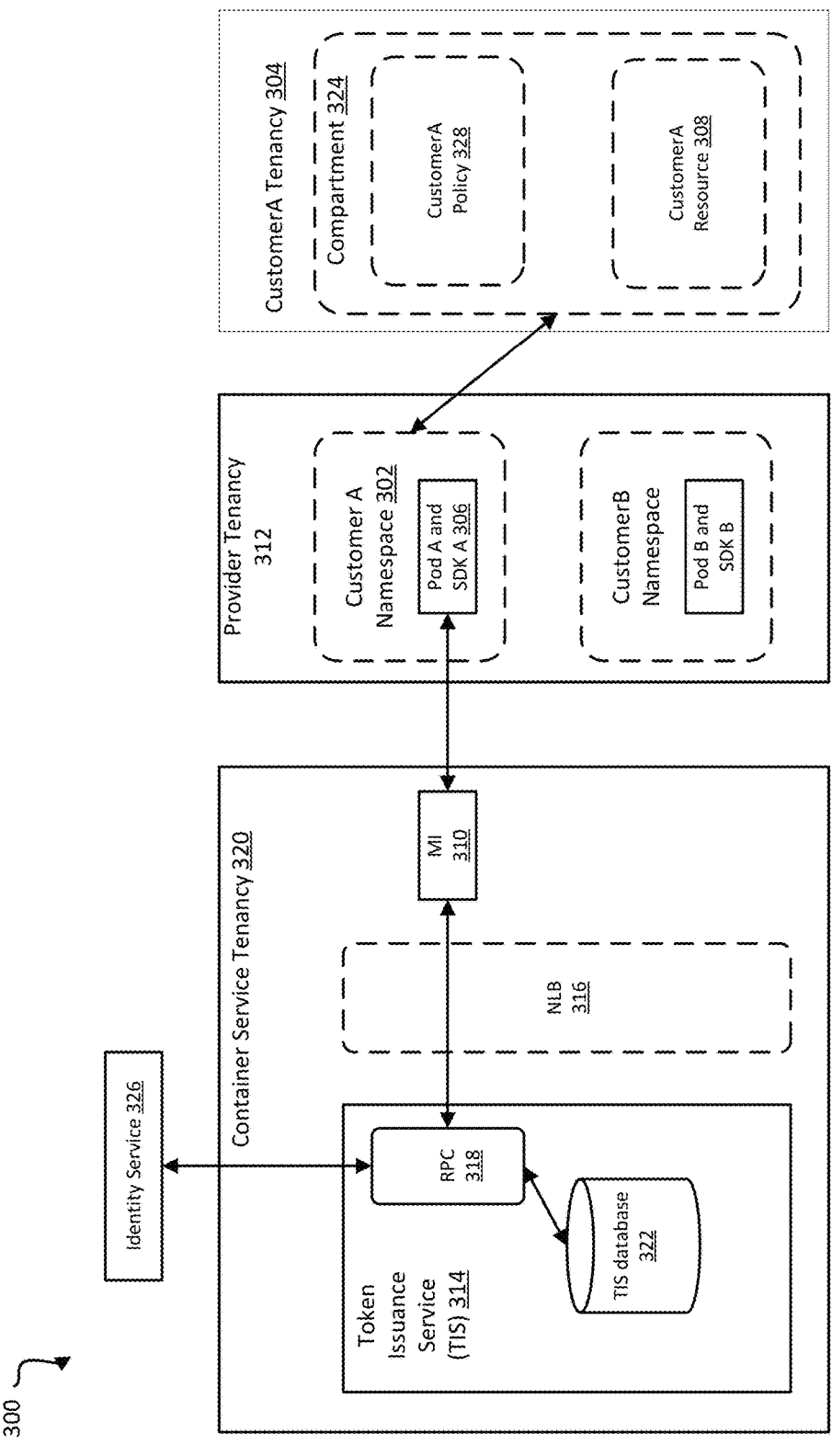
FIG. 3 is an illustration of an example system for requesting a token, according to one or more embodiments.

FIG. 3 is an illustration 300 of an example system for requesting a token, according to one or more embodiments. A pod (e.g., Pod A 110) associated with a namespace 302 (e.g., namespace 104) can transmit a message (e.g., an API call) to be received by a service that is managing a resource in the customer tenancy 304. A computing process associated with the software developer kit (SDK) 306 can intercept the message. The computing process can further determine whether a valid token permitting the pod to access the resource has been stored in a database associated with the customer namespace 302. In the event that a valid token has been stored, the computing process can transmit the token and the message to a service managing the resource 308. The valid token may have been stored in the database associated with the namespace 302 based on the pod or another pod associated with the namespace triggering a previous request for the token. The previous request may have triggered the creation and storing of the token.

In the event that there is no valid token, the computing process can transmit a message to a manager instance (MI) 310 to request a token. The message can include an identity of a service account associated with the pod, the namespace, and a cluster managing the namespace. Furthermore, the pod, the service account, and the cluster can be associated with a provider tenancy 312. The manager instance 310 can authenticate the message and determine whether computing process is authorized to request the token.

In the event that the manager instance 310 determines that the request is authenticated and authorized, the manager instance 310 can transmit a request for the token to a token issuance service 314 via a network load balancer (NLB) 316. In particular, the request can be received by a remote procedure call (RPC) framework 318 from the NLB 316. The RPC framework 318 can include an infrastructure to connect various services of a data center(s). The manager instance 310, the token issuance service 314, and the NLB 316 can be associated with a container service tenancy 320 (e.g., a Kubernetes tenancy). The RPC framework 318 can make an API call to a token issuance service database 322 (e.g., token issuance service database 216) to determine whether a mapping object binding the namespace 302 to a compartment 324 managing the customer resource 308 has been created. In the event that the mapping object has been created, the RPC framework 318 can transmit a request for a token and the mapping to the identity service 326. In some instances, the manager instance 310 transmits a binary large object (blob) along with the request from the token. The blob can include an identity of the cluster, namespace, and service account associated with the pod. The blob can further include an identity of the resource 308 to be accessed. In the event that the mapping exists, the token issuance service can update the values in the blob to reflect the mapping from the namespace 302 to the compartment 324.

The identity service 326 can receive the request from the token issuance service 314, and in particular, the RPC framework 318. The identity service 326 can authenticate request and determine whether the token issuance service 314 is authorized to make the request. The identify service can use the mapping object information received from the token issuance service 314 to identify and access the compartment 324. The identity service 326 can further access a policy 328 stored in the compartment 324 to determine whether the pod is permitted to access the resource 308. If the pod is not permitted to access the resource 308 under the policy 328, the identity service 326 does not issue the token. If, however, the pod is permitted to access the resource 308, then the identity service 326 generates the token. The token can include values for the namespace 302 and the compartment 324 based on the mapping.

The identity service 326 can transmit the token to the RPC framework 318. The RPC framework 318 can transmit the token to the manager instance 310. The manager instance 310 can transmit the token to the computing process associated with the SDK 306. The computing process can transmit a request for access to the resource 308 along with the token to a service managing the resource.

Figure 4:
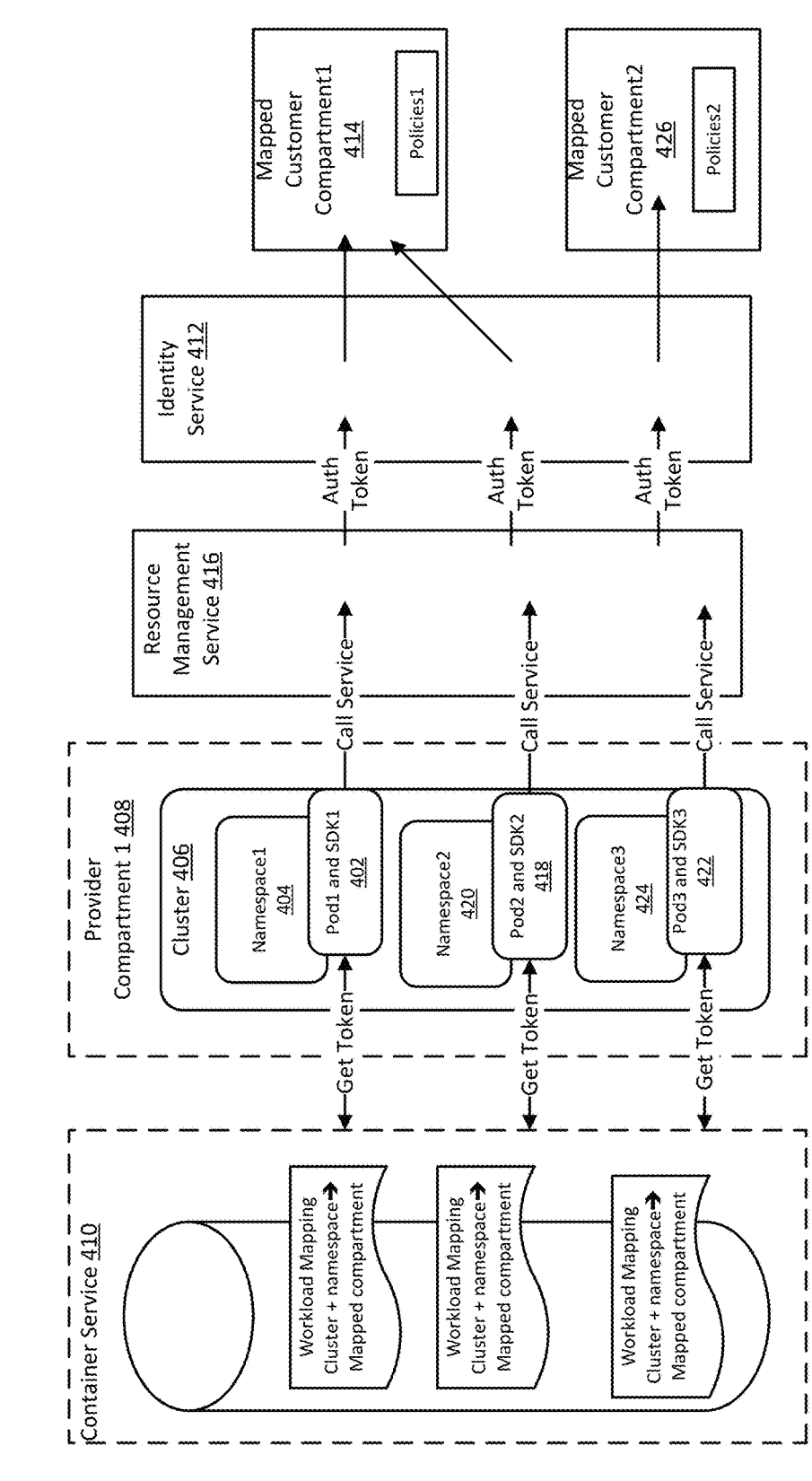
FIG. 4 is an illustration of an example system for mapping a namespace to a compartment.

FIG. 4 is an illustration 400 of an example system for mapping a namespace to a compartment. FIG. 4 illustrates three example scenarios for mapping a namespace to a compartment. In a first scenario, a first pod and SDK 402 (e.g., pod A 110) associated with a first namespace 404 (e.g., namespace 104) and a cluster 406 (e.g., cluster 102) can make an API call to access a resource managed under a customer tenancy. The cluster can be managed under a provider compartment 408, in which the provider is a CSP. A computing process associated with pod and SDK 402 can intercept the API call and determine whether a token to access the resource has been stored in the cluster 406. In the event that the token has not been stored, the computing process can make an API call to a container service 410 for the token. The container service can be managed by the same CSP as the cluster 406.

The container service 410 can include a manager instance (e.g., manager instance 310) and a token issuance service (e.g., token issuance service 314). The manager instance and the token issuance service can be in operable communication with an identity service 412 to request and generate a token authorizing the pod and SDK 402 to access the resource. In response to receiving a request from the manager instance, the token issuance service can access a token issuance service database to determine if a mapping object has been created between the namespace 404 and a compartment 414. In the event that a mapping object has been created, the token issuance service can transmit the mapping object along with a request for the token to the identity service 412. The identity service 412 can use the mapping object to identify and access a compartment managing the resource. The identity service 412 can further access a policy in the compartment to determine whether the pod and SDK 402 has permission to access the resource. The identity service 412 can return the token to the container service 410.

The container service 410 can return the token to the computing process associated with the pod and SDK 402. The computing process associated with the pod and SDK 402 can transmit the request along with the token to a resource management service 416 that manages the resource. The resource management service 416 can transmit the token that authorizes the pod with SDK 402 to access the resource to the identity service 412. The identity service 412 can authenticate the token. In response, the resource management service 416 can permit the pod with SDK 402 to access a resource managed by the compartment 414. The compartment 414 can be associated with the same customer (e.g., a first customer) as the pod and SDK 402. For example, first customer can request that the CSP manage the pod and SDK 402 and the first customer can manage the compartment 414.

In a second scenario, a second pod with an SDK 418 associated with a second namespace 420 and the cluster 406 (e.g., cluster 102) can transmit an API call to access the same resource as in the first scenario. However, the second namespace 420 may be associated with a different customer (e.g., a second customer) than the customer (e.g., the first customer) in the first scenario. In other words, a second pod and SDK 418 associated with the second customer can request to access the resource stored in the compartment 414 of the first customer. The cluster 406 can be managed by the same provider compartment 408 as in the first scenario. A computing processing associated with the second Pod and SDK 418 can intercept the API call and determine whether a token to access the resource has been stored in the cluster 406. As the second namespace 420 is different than the first namespace 404 of the first scenario, a token issued in the first scenario may invalid for the second namespace 420. The computing process can make an API call to the container service 410 to request a token.

As described above, the manager instance, the token issuance service, and the identity service 412 can operate together to generate the token authorizing the second pod and SDK 418 to access the resource. In response to receiving a request from the manager instance, the token issuance service can access a token issuance service database to determine if a mapping object has been created between the second namespace 420 and the compartment 414. In the event that a mapping object has been created, the token issuance service can transmit the mapping object information along with a request for the token to the identity service 412.

The container service 410 can return the token to the computing process associated with the second pod and SDK 418. The computing process associated with the second pod and SDK 418 can transmit the request along with the token to a resource management service 416 that manages the resource. The resource management service 416 can transmit the token to the identity service 412. The identity service 412 can authenticate the token. In response, the resource management service 416 can permit the second pod with the SDK 418 to access a resource managed by the first compartment 414. As illustrated, even if the second namespace 420 is associated with a different customer (e.g., the second customer) than the customer (e.g., the first customer) first namespace, the herein-described mapping object permits a CSP to grant or deny requests initiated from a compartment (e.g., the provider compartment) managed by the CSP for access to a resource managed by a customer's compartment (e.g., compartment 414).

In a third scenario, a third pod and SDK 422 associated with a third namespace 424 and the cluster 406 (e.g., cluster 102) can transmit an API call to access different resource in the first scenario or the second scenario. For example, the API call can be to access a second resource managed by a second compartment 426. The third namespace 424 may be associated with a different customer (e.g., third customer) than either the customer in the first scenario or the second scenario (e.g., the first customer and the second customer). The second compartment can be managed by the third customer. The cluster 406 can be managed by the same provider compartment 408 as in the first scenario and the second scenario. A computing process associated with third Pod and SDK 422 can intercept the API call and determine whether a token to access the resource managed by the second compartment 426 has been stored in the cluster 406. As the third namespace 424 is different than the first namespace 404 of the first scenario and the second namespace 420 of the second scenario, a token issued in either the first scenario or second scenario may invalid for the second namespace 420. The computing process can make an API call to the container service 410 to request a token for the third pod and SDK 422.

As indicated above, the manager instance, the token issuance service, and the identity service 412 can operate together to generate the token authorizing the third pod and SDK 422 to access the resource managed by the second compartment 426. In response to receiving a request from the manager instance, the token issuance service can access a token issuance service database to determine if a mapping object has been created between the third namespace 424 and the second compartment 426. In the event that a mapping object has been created, the token issuance service can transmit the mapping object information along with a request for the token to the identity service 412.

The container service 410 can return the token to the computing process associated with the third pod and SDK 422. The computing process associated with the SDK can transmit the request along with the token to a resource management service 416 that manages the resource. The resource management service 416 can transmit the token to the identity service 412. The identity service 412 can authenticate the token. In response, the resource management service 416 can permit the third pod and SDK 422 to access a resource managed by the second compartment 426. As illustrated, the mapping object can be configured to map various namespaces to various compartments. As illustrated, a mapping object can map a namespace in a provider managed tenancy to compartments in different customer tenancies. The herein described techniques provide checks for a CSP to permit a customer's pod that is managed in a provider tenancy to access a resource that is managed in a customer tenancy.

Figure 5:
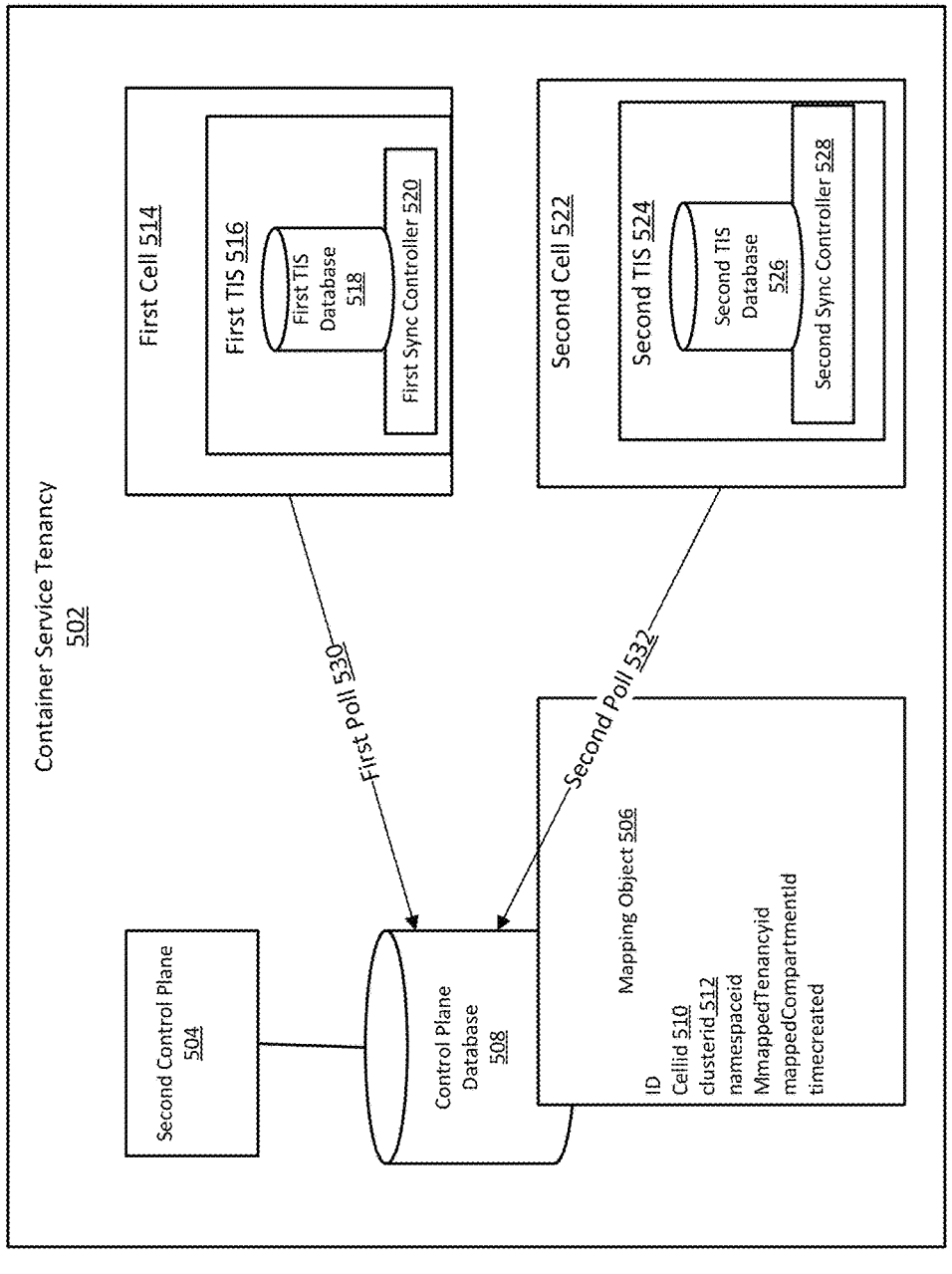
FIG. 5 is an illustration of a synchronization technique, according to one or more embodiments.

FIG. 5 is an illustration 500 of an example synchronization technique, according to one or more embodiments. In some embodiments, a container service tenancy (e.g., container service tenancy 208) can include multiple cells, where different clusters managed by a provider tenancy are associated with different cells. In these embodiments, a second control plane 504 (e.g., second control plane 210) can receive a mapping object 506, and store the mapping object in a control plane database 508 (e.g., control plane database 212).

The mapping object 506 can include various information elements, including a mapping object identifier, a cell identifier 510, a cluster identifier 512, a namespace identifier, a mapped tenancy identifier, a mapped compartment identifier, and a time created indication. The cell identifier 510 can be based on the cluster identifier 512. A first cell 514 can include a first token issuance service 516. The first token issuance service 516 can include a first token issuance service database 518 and a first synchronization controller 520. A second cell 522 can include a second token issuance service 524. The second token issuance service 524 can include a second token issuance service database 526 and a second synchronization controller 528. Each of the first cell 514 and the second cell 522 can be associated with different clusters. Each cluster can be associated with a respective namespace and service account. Therefore, a mapping object can include a mapping from a respective namespace to a compartment.

The control plane database 508 can receive a poll for a new mapping object from the first synchronization controller 520 and the second synchronization controller 528. As illustrated, each of the first cell 514 and the second cell 522 can be associated with a respective cell. Furthermore, each cell can be associated with a respective cluster. A first poll 530 from the first cell 514 can include first cell identifier for the first cell 514. A second poll 532 from the second cell 522 can include a second cell identifier for the second cell 522. The control plane database 508 can determine if any mapping objects have been received from a second control plane 504 since a poll prior the first poll 530 and the second poll 532. If no new mapping objects have been received, the control plane database 508 can respectively respond to the first poll 530 and second poll 532 that no new mapping objects have been received. Or the control plane database 508 can elect to not respond to either the first poll 530 or the second poll 532. In these instances, the first cell 514 and the second cell 522 can be configured to equate no response as no new mapping objects have been received.

If a new mapping object has been received, the control plane database 508 can access the cell identifier 510 and determine whether the cell identifier 510 included in the mapping object 506 matches a cell identifier included in the first poll 530 or the second poll 532. If the cell identifier 510 matches, then the mapping object 506 can be stored in the corresponding first token issuance service database 518 or the second token issuance service database 526. In this sense, the mapping object 506 may only be stored at the token issuance service database of the cell that corresponds to the mapping.

Figure 6:
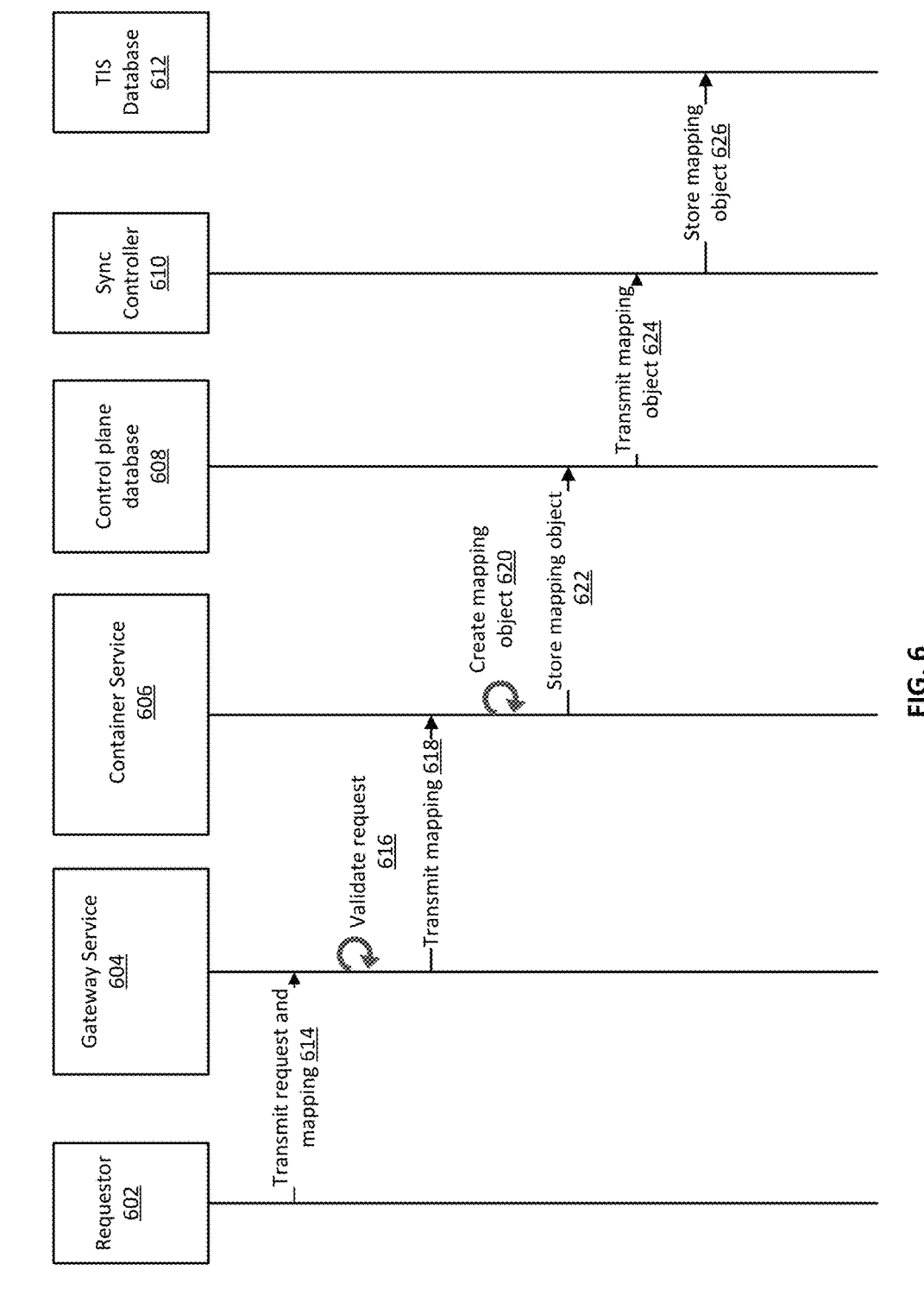
FIG. 6 is an example signaling diagram for storing a mapping object, according to one or more embodiments.

FIG. 6 is an example signaling diagram 600 for storing a mapping object, according to one or more embodiments. As illustrated, a requestor 602 can be in operable communication with a gateway service 604, a container service 606, control plane database 608, a synchronization controller 610, and a token issuance service database 612. While the operations of processes 600, 700, and 800 are described as being performed by generic computers, it should be understood that any suitable device may be used to perform one or more operations of these processes. Processes 600, 700, and 800 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At 614, the requestor 602 can create a mapping for a namespace associated with the customer and managed by a provider tenancy to a customer resource manager by a customer tenancy. The requestor 602 can further transmit the mapping and a request to store the mapping for token requests to a gateway service 604. At 616 the first control plane of the gateway service 604 can validate the request by determining whether the requestor 602 has permission to modify a cluster by creating the mapping from a namespace managed by a provider tenancy to a customer compartment managed by a customer tenancy. The first control plane can further determine whether the requestor 602 has permission to map the namespace to the customer resource in the customer compartment.

Assuming the first control plane validates the request at 614, the first control plane can transmit the mapping to the container service 606 at 616. In particular, the first control plane 614 can transmit the mapping to a second control plane 620 of the container service 606. At 620, the second control plane can create a mapping object based on the mapping. At 622, the second control plane can store the mapping object in a control plane database 608. The mapping object can include an identity of a CSP tenancy, cluster, and namespace to indicate which identities are to be used for the mapping object. The mapping object can also include an identity of the customer tenancy and the compartment that the namespace is to be mapped. In some instances, the resource is managed by a compartment.

In response to receiving the mapping object, the control plane database 608 can transmit the mapping object to a synchronization controller 610 at 624. In some instances, the control plane database 608 can transmit the mapping object in response to a message (e.g., a poll message) from the synchronization controller 610. At 626, the synchronization controller 610 can store the mapping object in the token issuance service database 612.

Figure 7:
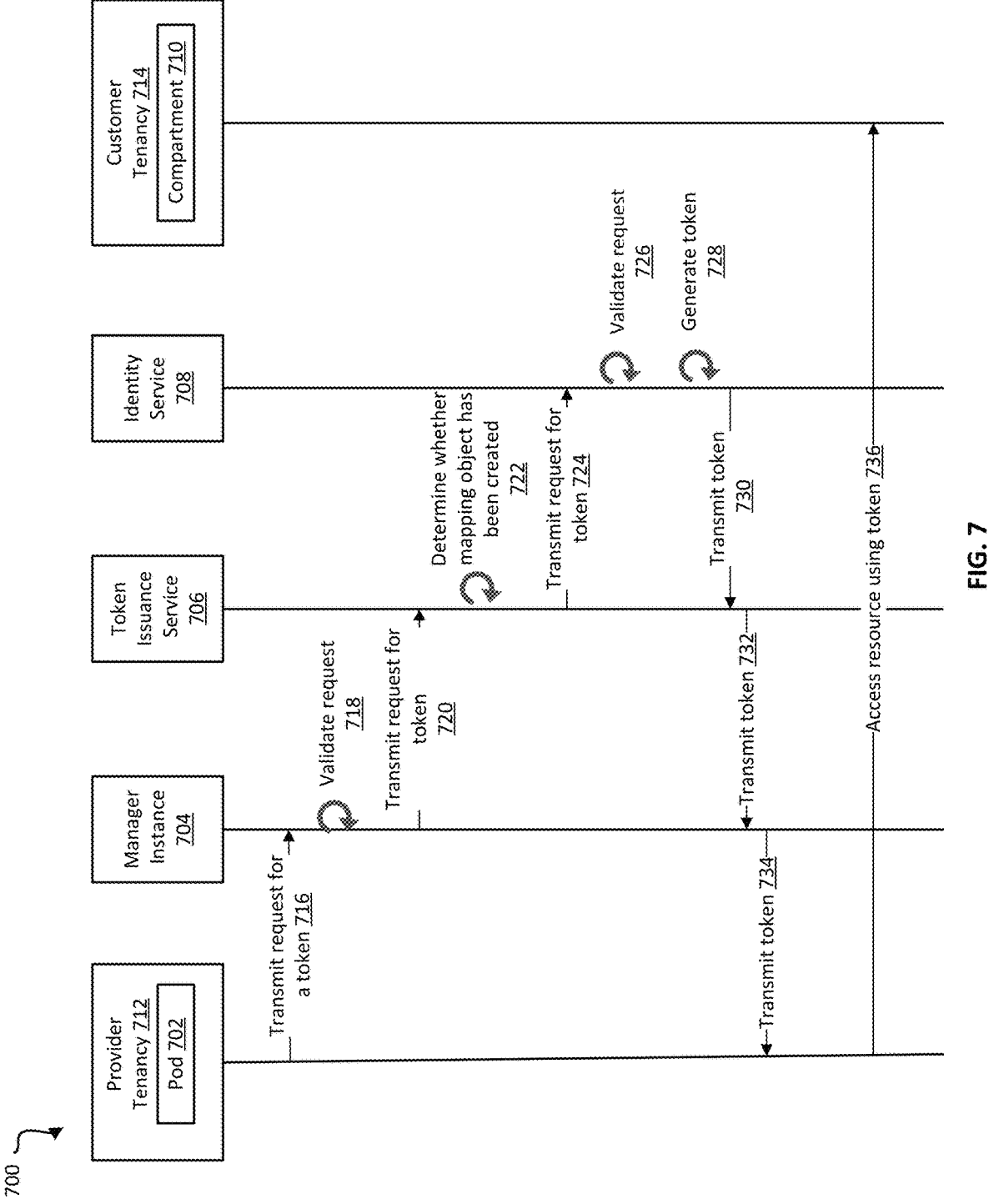
FIG. 7 is an example signaling diagram for accessing a mapping object according to one or more embodiments.

FIG. 7 is an example signaling diagram 700 for accessing a mapping object according to one or more embodiments. Ats illustrated a pod 702 can be in operable communication with a manager instance 704, a token issuance pod 706, identity service 708, and a compartment 710. The pod 702 can be managed by a provider tenancy 712 and the compartment can be managed by a customer tenancy 714. The pod 702 can transmit a message (e.g., an API call) to be received by a service that is managing a resource in the customer tenancy 304. A computing process can intercept the message and determine whether a valid token permitting the pod to access the resource has been stored in a database. In the event that there is no valid token, the pod, via the computing process, can transmit a request to a manager instance 704 for the token. The message can include an identity of a service account associated with the pod, the namespace, and a cluster managing the namespace. At 718, the manager instance 310 can validate the request by authenticating the message and determining whether the pod 702 is authorized to request the token.

In the event that the manager instance 704 validates the request at 718, the manager instance 704 can transmit a request for the token to a token issuance service 706 at 720. At 722, the token issuance service 706 can access a token issuance service database) to determine whether a mapping object has been created. In the event that the mapping object has been created, the token issuance service 706 can transmit a request for a token and the mapping to the identity service 708. The request can include an identity of the cluster, namespace, and service account associated with the pod. The request can further include an identity of the resource to be accessed.

The identity service 708 can receive the request from the token issuance service 706, and in particular, the RPC framework 318. At 726, the identity service 708 can validate the request by authenticating the request and determining whether the token issuance service 706 is authorized to make the request. The identity service 708 can use the mapping object to further access a policy stored in the compartment 710 to determine whether the pod 702 is permitted to access the resource managed by the compartment. If the pod 702 is not permitted to access the resource under the policy, the identity service 708 does not issue the token. If, however, the pod 702 is permitted to access the resource, then the identity service 708 generates the token at 728. The token can include values for the namespace and the compartment 710 based on the mapping.

At 730, the identity service 708 can transmit the token to the token issuance service 706. At 732, the token issuance service 706 can transmit the token to the manager instance 704. At 734, the manager instance 704 can transmit the token to the pod 702. At 736, the pod 702 can use the token to access the resource managed by the compartment 710.

FIG. 8 is an example process flow 800 for using a mapping object to access a resource, according to one or more embodiments. At 802, the method can include a manager instance of a computing system receiving, from a pod (e.g., pod 110), a first request for a token used to access to a resource (e.g., resource 308) managed by a customer tenancy (customer tenancy 304). The pod can be managed by a provider tenancy and associated with a namespace. The first request can include validation information for the pod. The manager instance can further validate the first request.

At 804, the method can include the manager instance of the computing system transmitting, to a token issuance service (e.g., token issuance service 314) of the computing system, a second request for the token. The second request can be similar to the first request, but further include validation information for the manager instance. The token issuance service can further validate the second request.

At 806, the method can further include the computing system identifying, by the token issuance service of the computing system, a mapping object mapping the namespace to the resource, the mapping object can include a cell identifier, a cluster identifier, namespace identified, a mapped tenancy identifier, a compartment identifier, and time that the mapped object was created. The mapping token issuance service can access the mapping object from a token issuance service database (e.g., token issuance service database 322).

At 808, the method can further include the computing system transmitting, by the token issuance service of the computing system and to an identity service (e.g., identity service 326) of the computing system, the mapping object and a third request for the token. The third request can be similar to the first request and the second request, but include validation information for the token issuance service. The identity service can validate the third request.

At 810, the method can further include identifying, by the identity service of the computing system, a compartment (e.g., compartment 324) of the customer tenancy based at least in part on the compartment identifier, the compartment managing the resource. The identity service can use the information provided in the mapping object, such as the identity of the compartment in the customer tenancy to access the compartment.

At 812, the method can further include the computing system accessing, by the identity service of the computing system, a policy stored in a compartment. The policy (e.g., policy 328) can be generated by the customer that manages the customer tenancy. The policy can further by a service account (e.g., first service account 106) wide policy that either enables or forbids each pod associated with the service account to access the resource.

At 814, the method can further include the computing system determining, by the identity service of the computing system, whether the pod has permission to access the resource based at least in part on the policy. The policy can specify whether the pod can access the resource.

At 816, the method can further include computing system generating, by the identity service of the computing system, the token based at least in part on the mapping object and the policy. The token can be used by any pod associated with the service account to access the resource. In some instances, the token can be an ephemeral token, such that the token expires after a period of time. In the event that the token expires, a pod attempting to access the resource may request another token. The identity service may then have an opportunity to determine if the policy has changed since generating the previous token. The identity service can then generate a new token based on the current policy.

At 818, the method can further include the identity service of the computing system transmitting, by the identity service of the computing system, the token to the pod. The pod can then use the token to access the resource.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
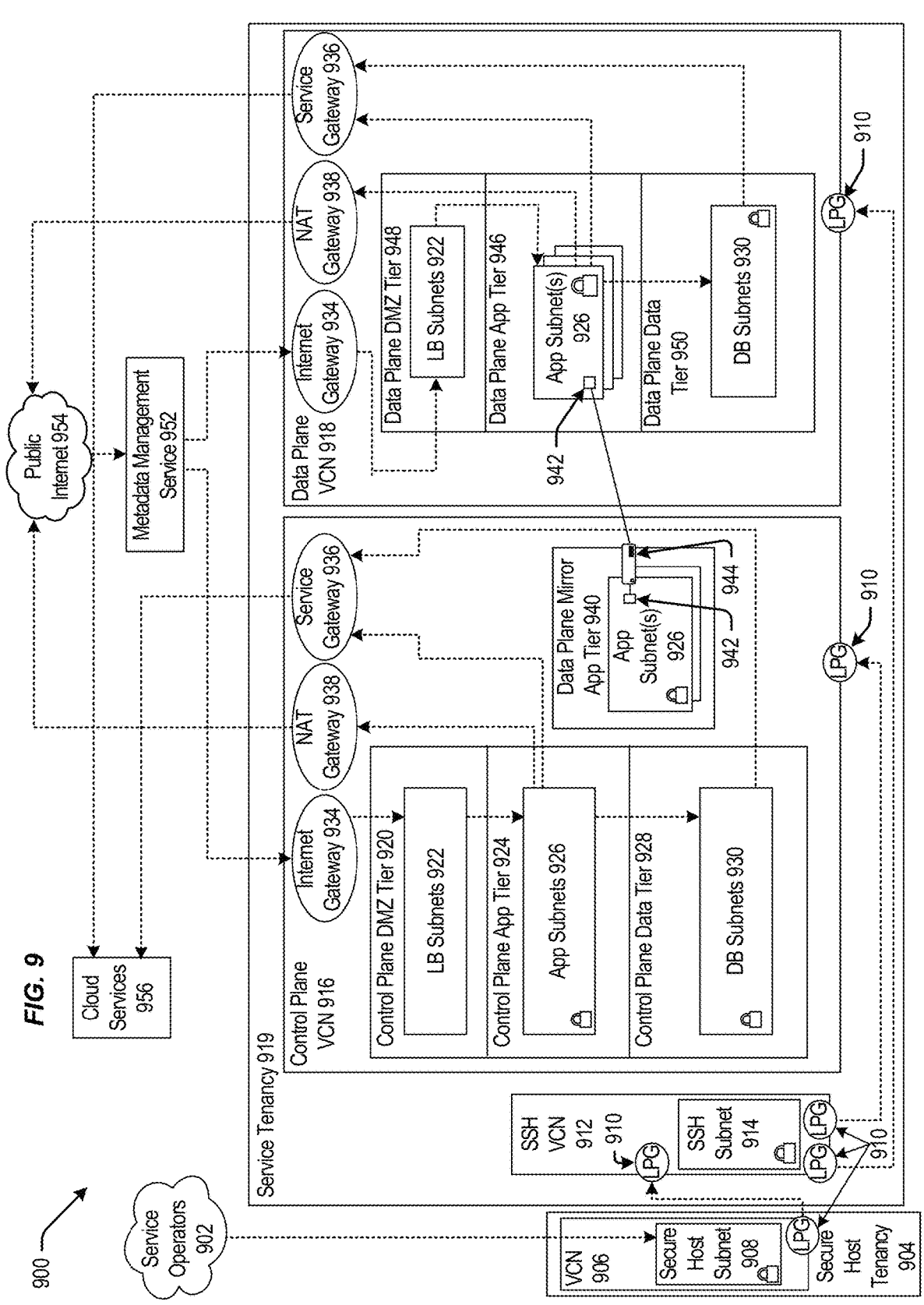
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively coupled to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
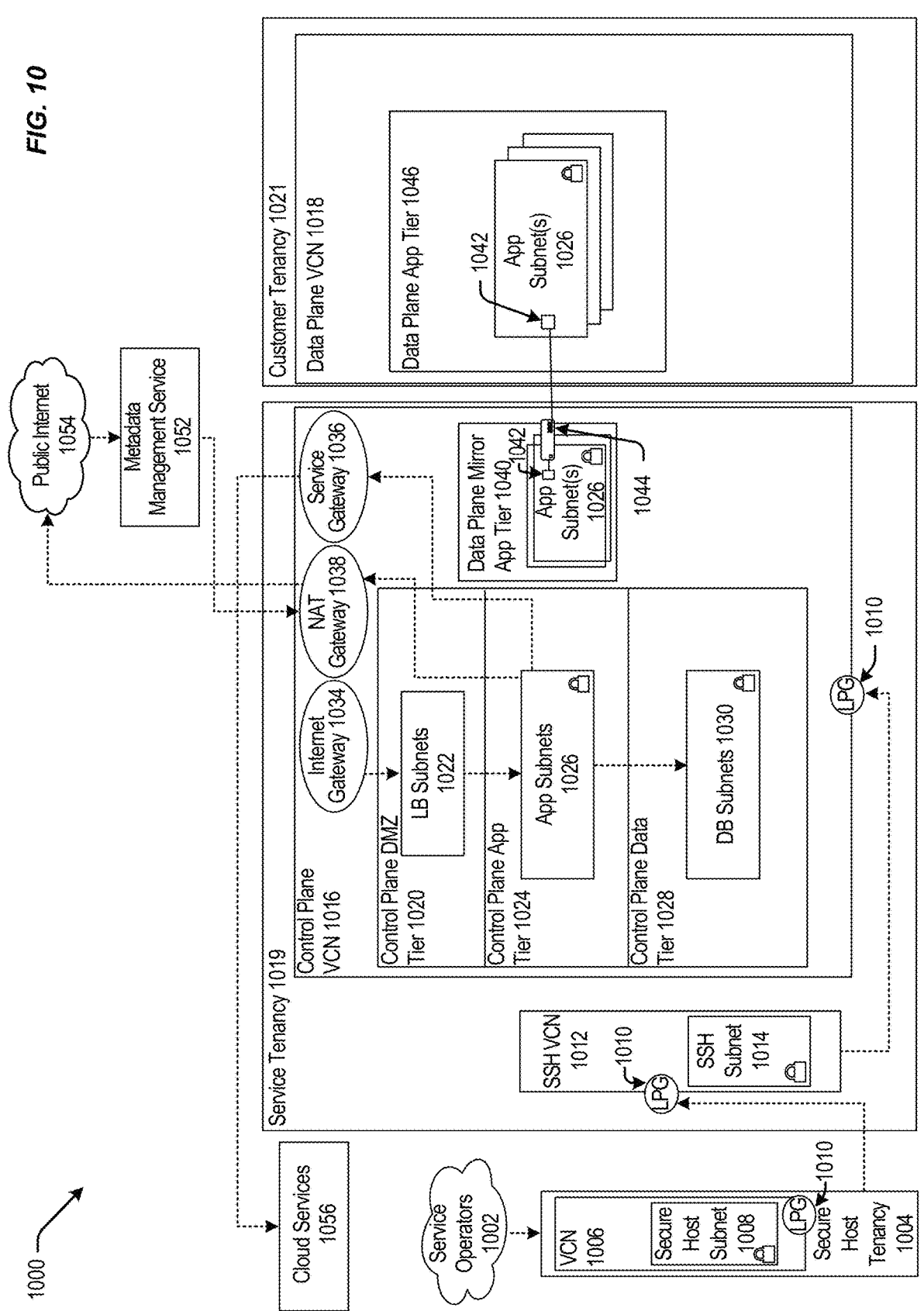
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively coupled to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
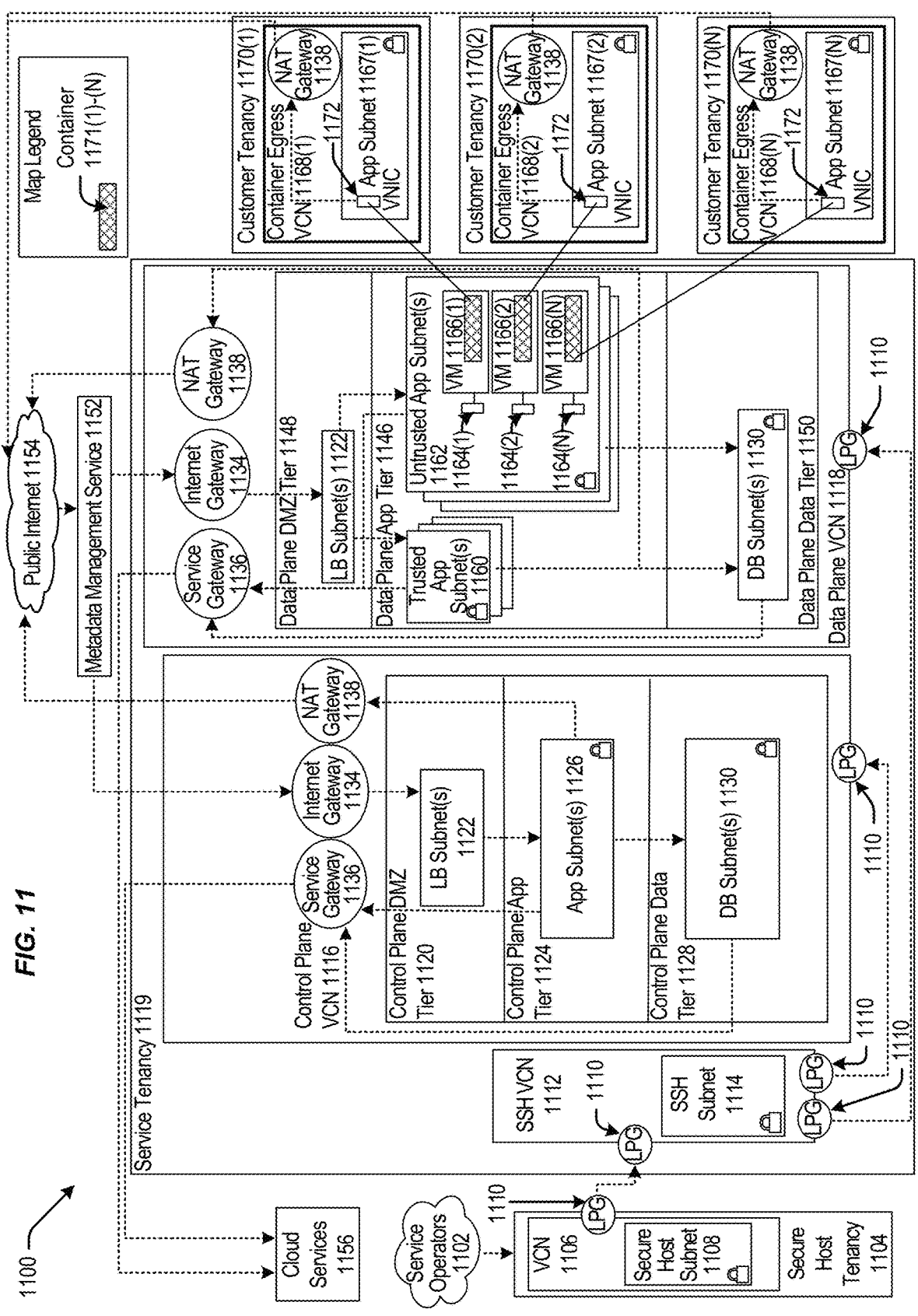
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118.

The service gateway 1136 contained in the control plane VCN 1116 and contained in the data plane VCN 1118 can be communicatively coupled to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171(1)-(N) may be communicatively coupled to the customer tenancy 1170 and may be configured to transmit or receive data from the customer tenancy 1170. The containers 1171(1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
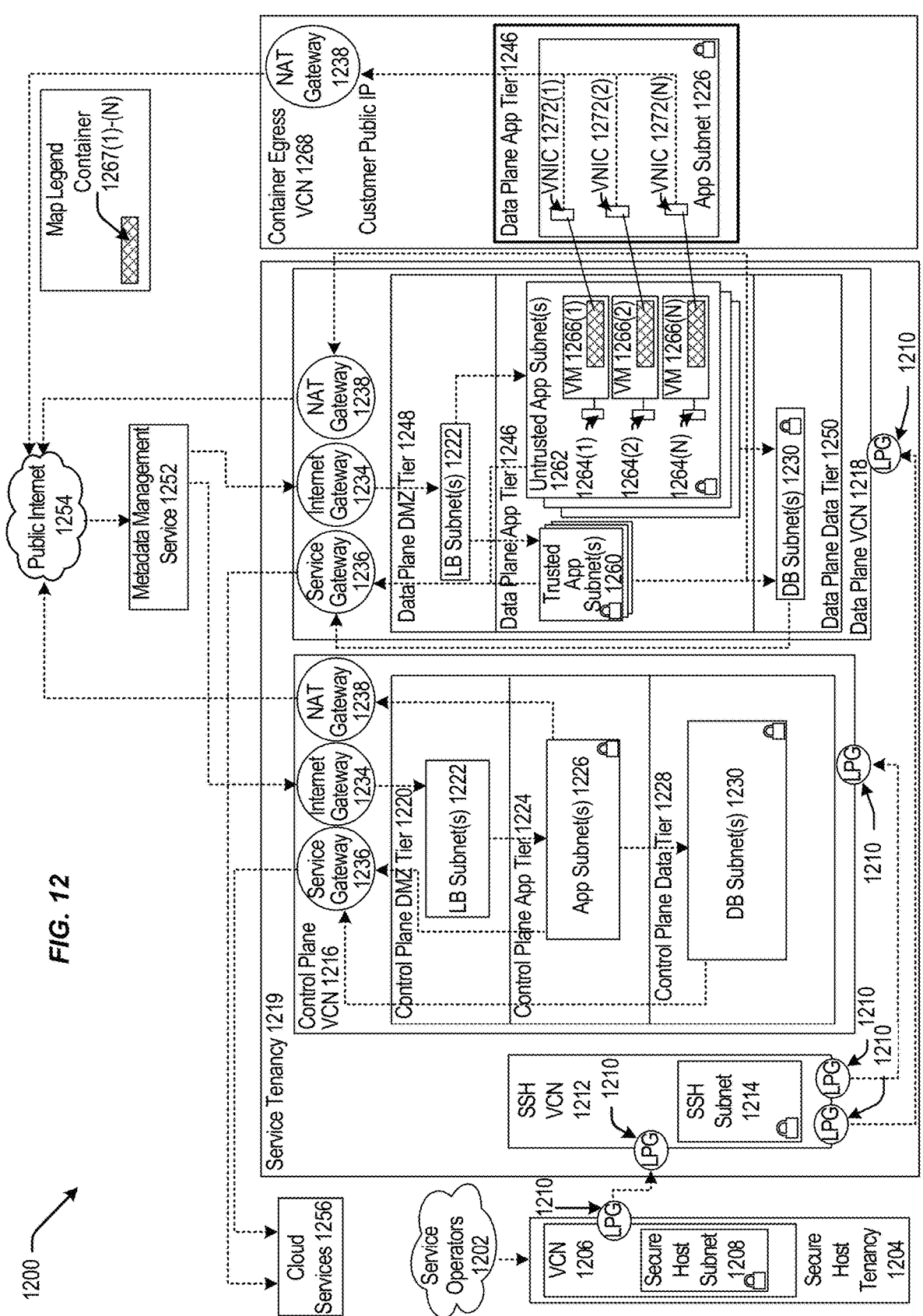
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N), and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively coupled to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
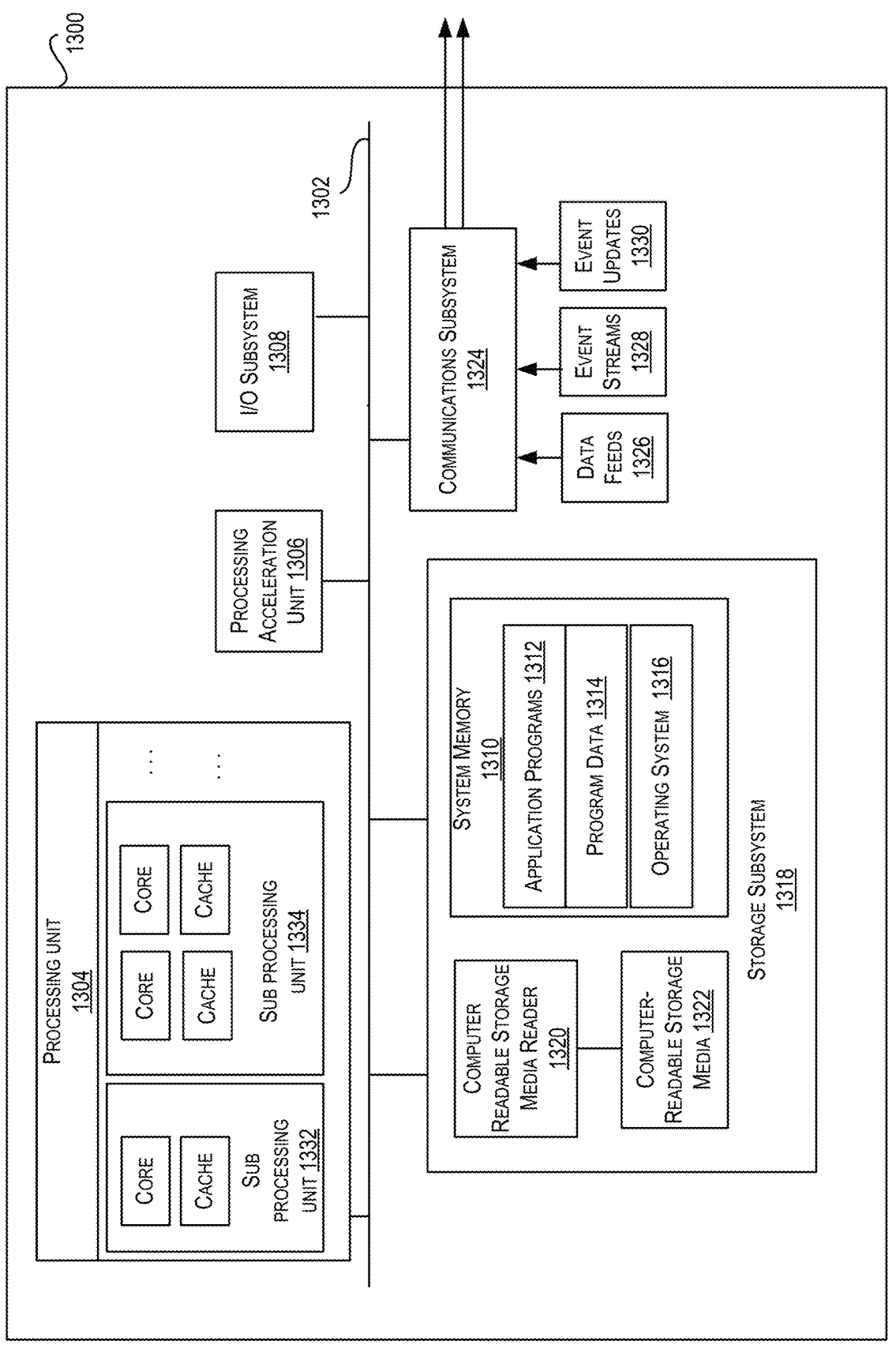
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional micropro-cessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage age medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by a manager instance of a computing system and from a pod, a first request for a token used to access a resource managed by a customer tenancy, the pod managed by a provider tenancy and associated with a namespace;

transmitting, by the manager instance of the computing system and to a token issuance service of the computing system, a second request for the token;

identifying, by the token issuance service of the computing system, a mapping object that maps the namespace to the resource, the mapping object comprising a namespace identifier and a compartment identifier;

transmitting, by the token issuance service of the computing system and to an identity service of the computing system, the mapping object and a third request for the token;

identifying, by the identity service of the computing system, a compartment of the customer tenancy based at least in part on the compartment identifier, the compartment managing the resource;

accessing, by the identity service of the computing system, a policy stored in a compartment;

determining, by the identity service of the computing system, whether the pod has permission to access the resource based at least in part on the policy;

generating, by the identity service of the computing system, the token based at least in part on the mapping object and the policy; and transmitting, by the identity service of the computing system, the token to the pod.

2. The method of claim 1, wherein the mapping object comprises a second instance of the mapping object, and wherein the method further comprises:

receiving, by a gateway service of the computing system, mapping information from an entity managing the compartment;

transmitting, by the gateway service of the computing system and to a container service of the computing system, the mapping information;

generating, by the container service of the computing system, a first instance of the mapping object based at least in part on the mapping information; and storing, by the container service of the computing system, the first instance of the mapping object in a first database.

3. The method of claim 2, wherein the method further comprises:

transmitting, by the first database and to a synchronization controller, a record of storing the first instance of the mapping object based at least in part on storing the first instance of the mapping object in the first database;

accessing, by the synchronization controller, the first instance of the mapping object in the first database based at least in part on the record;

generating, by the synchronization controller, the second instance of the mapping object; and storing, by the synchronization controller, the second instance of the mapping object in a second database associated with the token issuance service.

4. The method of claim 3, wherein the mapping object is associated with a cell, wherein the mapping object further comprises a cell identifier, and wherein determining whether a mapping object that maps the namespace to the resource has been created comprises:

transmitting, by a synchronization controller, a message to the first database as to whether any mapping object has been stored in the first database, wherein the message includes the cell identifier;

determining, by the first database, whether the first instance of the mapping object is associated with the cell based at least in part on the cell identifier;

transmitting, by the first database and to the synchronization controller, a response indicating whether the first instance of the mapping object is stored in the first database;

accessing, by the synchronization controller, the first instance of the mapping object in the first database based at least in part on the response;

generating, by the synchronization controller, a second instance of the mapping object, wherein the mapping object comprises the second instance of the mapping object; and storing, by the synchronization controller, the second instance of the mapping object in a second database associated with the token issuance service.

5. The method of claim 2, wherein the method further comprises:

transmitting, by a synchronization controller, a message to the first database as to whether any mapping object has been stored in the first database;

receiving, by the synchronization controller and based at least in part on the message, a response from the first database that the first instance of the mapping object has been stored in the first database;

accessing, by the synchronization controller, the first instance of the mapping object in the first database based at least in part on receiving the response;

generating, by the synchronization controller, the second instance of the mapping object; and storing, by the synchronization controller, the second instance of the mapping object in a second database associated with the token issuance service.

6. The method of claim 2, wherein the mapping object is stored in a second database, and wherein the second database is configured to store a set number of mapping objects.

7. The method of claim 1, wherein the method further comprises:

validating, by the manager instance of the computing system, the first request, wherein the manager instance transmits the second request based at least in part on the validating the first request.

8. A computing system comprising:

one or more processors; and one or more computer-readable media having stored thereon a sequence of instructions that, when executed, cause the one or more processors to:

receive, by a manager instance of the computing system and from a pod, a first request for a token used to access a resource managed by a customer tenancy, the pod managed by a provider tenancy and associated with a namespace;

transmit, by the manager instance of the computing system and to a token issuance service of the computing system, a second request for the token;

identify, by the token issuance service of the computing system, a mapping object that maps the namespace to the resource, the mapping object comprising a namespace identifier and a compartment identifier;

transmit, by the token issuance service of the computing system and to an identity service of the computing system, the mapping object and a third request for the token;

identify, by the identity service of the computing system, a compartment of the customer tenancy based at least in part on the compartment identifier, the compartment managing the resource;

access, by the identity service of the computing system, a policy stored in a compartment;

determine, by the identity service of the computing system, whether the pod has permission to access the resource based at least in part on the policy;

generate, by the identity service of the computing system, the token based at least in part on the mapping object and the policy; and transmit, by the identity service of the computing system, the token to the pod.

9. The computing system of claim 8, wherein the mapping object comprises a second instance of the mapping object, and wherein the sequence of instructions, when executed, cause the one or more processors to:

receive, by a gateway service of the computing system, mapping information from an entity managing the compartment;

transmit, by the gateway service of the computing system and to a container service of the computing system, the mapping information;

generate, by the container service of the computing system, a first instance of the mapping object based at least in part on the mapping information; and store, by the container service of the computing system, the first instance of the mapping object in a first database.

10. The computing system of claim 9, wherein the sequence of instructions, when executed, cause the one or more processors to:

transmit, by the first database and to a synchronization controller, a record of storing the first instance of the mapping object based at least in part on storing the first instance of the mapping object in the first database;

access, by the synchronization controller, the first instance of the mapping object in the first database based at least in part on the record;

generate, by the synchronization controller, the second instance of the mapping object; and storing, by the synchronization controller, the second instance of the mapping object in a second database associated with the token issuance service.

11. The computing system of claim 10, wherein the mapping object is associated with a cell, wherein the mapping object further comprises a cell identifier, and wherein determining whether a mapping object that maps the namespace to the resource has been created comprises:

transmitting, by a synchronization controller, a message to the first database as to whether any mapping object has been stored in the first database, wherein the message includes the cell identifier;

determining, by the first database, whether the first instance of the mapping object is associated with the cell based at least in part on the cell identifier;

transmitting, by the first database and to the synchronization controller, a response indicating whether the first instance of the mapping object is stored in the first database;

accessing, by the synchronization controller, the first instance of the mapping object in the first database based at least in part on the response;

generating, by the synchronization controller, a second instance of the mapping object, wherein the mapping object comprises the second instance of the mapping object; and storing, by the synchronization controller, the second instance of the mapping object in a second database associated with the token issuance service.

12. The computing system of claim 9, wherein the sequence of instructions, when executed, cause the one or more processors to:

transmit, by a synchronization controller, a message to the first database as to whether any mapping object has been stored in the first database;

receive, by the synchronization controller and based at least in part on the message, a response from the first database that the first instance of the mapping object has been stored in the first database;

access, by the synchronization controller, the first instance of the mapping object in the first database based at least in part on receiving the response;

generate, by the synchronization controller, the second instance of the mapping object; and store, by the synchronization controller, the second instance of the mapping object in a second database associated with the token issuance service.

13. The computing system of claim 9, wherein the mapping object is stored in a second database, and wherein the second database is configured to store a set number of mapping objects.

14. The computing system of claim 8, wherein the sequence of instructions, when executed, cause the one or more processors to:

validating, by the manager instance of the computing system, the first request, wherein the manager instance transmits the second request based at least in part on the validating the first request.

15. One or more non-transitory computer-readable media having stored thereon a sequence of instructions that, when executed by one or more processors of a computing system, cause the computing system to:

receive, by a manager instance of the computing system and from a pod, a first request for a token used to access a resource managed by a customer tenancy, the pod managed by a provider tenancy and associated with a namespace;

transmit, by the manager instance of the computing system and to a token issuance service of the computing system, a second request for the token;

identify, by the token issuance service of the computing system, a mapping object that maps the namespace to the resource, the mapping object comprising a namespace identifier and a compartment identifier;

transmit, by the token issuance service of the computing system and to an identity service of the computing system, the mapping object and a third request for the token;

identify, by the identity service of the computing system, a compartment of the customer tenancy based at least in part on the compartment identifier, the compartment managing the resource;

access, by the identity service of the computing system, a policy stored in a compartment;

determine, by the identity service of the computing system, whether the pod has permission to access the resource based at least in part on the policy;

generate, by the identity service of the computing system, the token based at least in part on the mapping object and the policy; and transmit, by the identity service of the computing system, the token to the pod.

16. The one or more non-transitory computer-readable media of claim 15, wherein the mapping object comprises a second instance of the mapping object, and wherein the sequence of instructions, when executed, cause the one or more processors to:

receive, by a gateway service of the computing system, mapping information from an entity managing the compartment;

transmit, by the gateway service of the computing system and to a container service of the computing system, the mapping information;

generate, by the container service of the computing system, a first instance of the mapping object based at least in part on the mapping information; and store, by the container service of the computing system, the first instance of the mapping object in a first database.

17. The one or more non-transitory computer-readable media of claim 16, wherein the sequence of instructions, when executed, cause the one or more processors to:

transmit, by the first database and to a synchronization controller, a record of storing the first instance of the mapping object based at least in part on storing the first instance of the mapping object in the first database;

access, by the synchronization controller, the first instance of the mapping object in the first database based at least in part on the record;

generate, by the synchronization controller, the second instance of the mapping object; and storing, by the synchronization controller, the second instance of the mapping object in a second database associated with the token issuance service.

18. The one or more non-transitory computer-readable media of claim 17, wherein the mapping object is associated with a cell, wherein the mapping object further comprises a cell identifier, and wherein determining whether a mapping object that maps the namespace to the resource has been created comprises:

transmitting, by a synchronization controller, a message to the first database as to whether any mapping object has been stored in the first database, wherein the message includes the cell identifier;

determining, by the first database, whether the first instance of the mapping object is associated with the cell based at least in part on the cell identifier;

transmitting, by the first database and to the synchronization controller, a response indicating whether the first instance of the mapping object is stored in the first database;

accessing, by the synchronization controller, the first instance of the mapping object in the first database based at least in part on the response;

generating, by the synchronization controller, a second instance of the mapping object, wherein the mapping object comprises the second instance of the mapping object; and storing, by the synchronization controller, the second instance of the mapping object in a second database associated with the token issuance service.

19. The one or more non-transitory computer-readable media of claim 16, wherein the sequence of instructions, when executed, cause the one or more processors to:

transmit, by a synchronization controller, a message to the first database as to whether any mapping object has been stored in the first database;

receive, by the synchronization controller and based at least in part on the message, a response from the first database that the first instance of the mapping object has been stored in the first database;

access, by the synchronization controller, the first instance of the mapping object in the first database based at least in part on receiving the response;

generate, by the synchronization controller, the second instance of the mapping object; and store, by the synchronization controller, the second instance of the mapping object in a second database associated with the token issuance service.

20. The one or more non-transitory computer-readable media of claim 16, wherein the mapping object is stored in a second database, and wherein the second database is configured to store a set number of mapping objects.

* * * * *